United States Patent
Nagata et al.

(10) Patent No.: US 9,971,042 B2
(45) Date of Patent: May 15, 2018

(54) SCINTILLATOR PANEL

(71) Applicant: KONICA MINOLTA, INC., Chiyoda-ku, Tokyo (JP)

(72) Inventors: Yasushi Nagata, Kodaira (JP); Kei Isoda, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days. days.

(21) Appl. No.: 15/642,712

(22) Filed: Jul. 6, 2017

(65) Prior Publication Data

US 2018/0011207 A1  Jan. 11, 2018

(30) Foreign Application Priority Data

Jul. 11, 2016 (JP) ................................. 2016-136836

(51) Int. Cl.
  *G01T 1/20* (2006.01)

(52) U.S. Cl.
  CPC ................. *G01T 1/2018* (2013.01)

(58) Field of Classification Search
  CPC .................................................. G01T 1/2018
  See application file for complete search history.

(56) References Cited

U.S. PATENT DOCUMENTS

| | | | | |
|---|---|---|---|---|
| 4,234,792 A * | 11/1980 | DeCou | ............... | G01T 1/2018 250/366 |
| 4,720,426 A * | 1/1988 | Englert | ............... | G01T 1/2002 250/361 R |
| 6,541,774 B1 * | 4/2003 | DeJule | ............... | G01T 1/2018 250/370.08 |
| 7,820,297 B2 * | 10/2010 | Benson | ............... | B32B 27/28 428/423.1 |
| 2005/0072931 A1 * | 4/2005 | Albagli | ............... | G01T 1/2018 250/370.11 |
| 2011/0017916 A1 * | 1/2011 | Schulz | ............... | G01T 1/202 250/368 |
| 2014/0042329 A1 * | 2/2014 | Okada | ............... | G01T 1/2006 250/366 |
| 2014/0239196 A1 * | 8/2014 | Shoji | ............... | G01T 1/202 250/488.1 |
| 2015/0323683 A1 * | 11/2015 | Vasilyev | ............... | G01V 5/107 250/269.1 |
| 2016/0109587 A1 * | 4/2016 | Wieczorek | ............... | G01T 1/2018 250/362 |

FOREIGN PATENT DOCUMENTS

JP          2014142217 A      8/2014

* cited by examiner

*Primary Examiner* — Marcus Taningco
(74) *Attorney, Agent, or Firm* — Holtz, Holtz & Volek PC

(57) ABSTRACT

[Problem] Provided is a scintillator panel which is capable of imaging at a low dose while suppressing the contrast deterioration caused by scattered radiation, and further has improved luminance and MTF.
[Solving Means] A scintillator panel having a scintillator layer for converting radiation into light, characterized in that the scintillator layer is in direct contact on a photoelectric conversion element and includes a reflecting layer and a scattered radiation diffusing layer on a radiation incident side of the scintillator layer, the scattered radiation diffusing layer is present closer to the radiation incident side than the reflecting layer, and the scattered radiation diffusing layer has an X-ray transmittance of 99.5% or more.

10 Claims, 1 Drawing Sheet

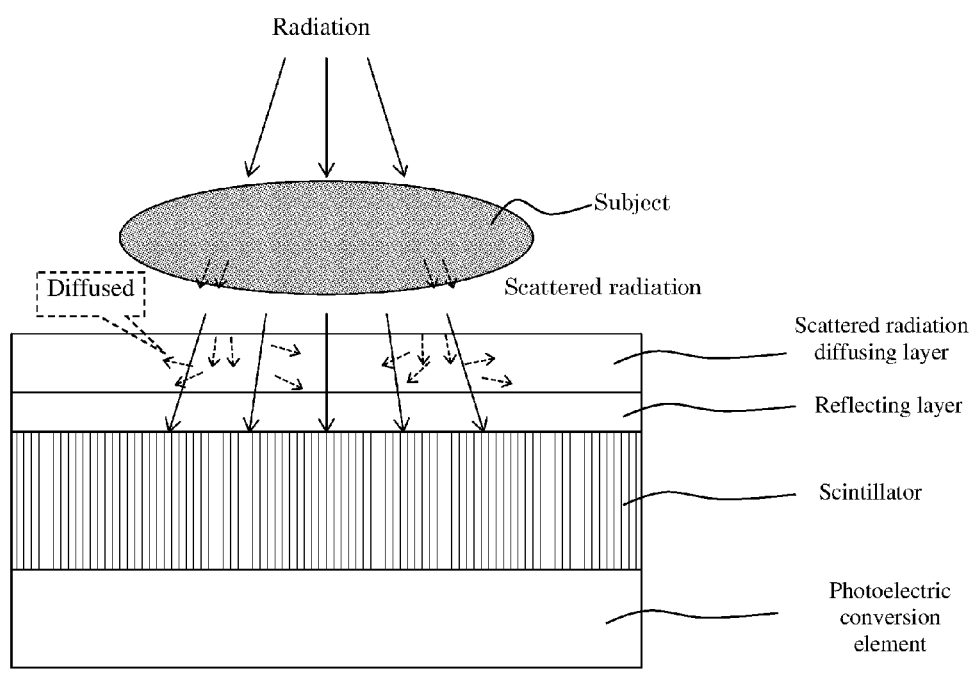

SCINTILLATOR PANEL

DESCRIPTION OF THE RELATED ART

The present U.S. patent application claims a priority under the Paris Convention of Japanese patent application No. 2016-136836 filed on Jul. 11, 2016, the entirety of which is incorporated herein by references.

TECHNOLOGICAL FIELD

The present invention relates to a scintillator panel which is capable of imaging at a low dose while suppressing the contrast deterioration caused by scattered radiation, and further has improved luminance and MTF.

BACKGROUND

Recent years, digital radiation image detectors represented by, for example, computed radiography (CR) and flat panel detectors (FPD) have been broadly used in image diagnosis in hospitals, clinics and the like because they allow radiation images to be obtained directly and are capable of displaying the images directly on an image-displaying apparatus such as a cathode tube or a liquid crystal panel. Recently, flat panel which utilizes a scintillator layer containing cesium iodide (CsI) and is combined with a thin film transistor (TFT) have attracted attention as a highly sensitive X-ray image visualization system.

In such X-ray imaging, when X-rays are irradiated onto a subject, the incident radiation gets slightly scattered, depending on the subject as well as a plate member and a case present as necessary on a radiation incident side.

As a result, on a scintillator portion where the dose of incident radiation would be large otherwise, the dose of the incident radiation becomes smaller because of the scattering. On the other hand, scattered radiation enters a scintillator portion where the dose of incident radiation should be small without the scattering, causing a phenomenon in which the dose of incident radiation on the portion becomes larger.

Consequently, radiation images taken in such a situation have caused a problem such as the decrease in contrast due to the weak scattered radiation and the reduced quality of radiation images due to the occurrence of fogging and blurring. Such radiation images have been liable to interfere with precise diagnosis by use of radiation images because, for example, they do not help measure the exact size of a lesion site captured in the radiation images and make it difficult to determine if the lesion site is becoming bigger or smaller.

Conventionally, as a method for removing such scattered X-rays, it has been known to locate a plate in which a lead foil is arranged in slits or in a lattice shape (referred to as grid, and a method for removing scattered X-rays using such a grid is called grid method) between a subject and a detector (scintillator) and thus absorb and remove the scattered X-rays. However, there has been a problem in which a larger dose of radiation is required since even X-rays necessary for the imaging are also absorbed.

As another method for removing scattered X-rays, air gap method is also known. In the air gap method, the subject is located closer to the radiation source, and a distance of several tens of centimeters is placed between the scintillator and the plate member, forming an air gap therebetween. Then, the scattered X-rays from the subject are diffused and are more unlikely to reach the scintillator. In this method, although the contrast improves, there has been a problem of a smaller area available for the imaging due to the approach of the subject to the radiation source and of the decrease in sharpness because of larger blurring along with the expansion of the image.

The applicant of the present invention proposes, in JP 2014-142217 A (Patent Document 1), a radiation image forming apparatus capable of removing scattered X-rays by use of a radiation absorbing layer and preventing the decrease in contrast of radiation images, wherein the radiation absorbing layer is provided within the range of 0 to 0.5 mm from a radiation incident side of a phosphor of the scintillator towards the plate member.

However, when a layer that absorbs a large amount of radiation is present, more radiation than in a conventional case is required in order to obtain the same image quality as when radiation is not absorbed. Originally, it is desired that the examination is performed only on a necessary site at a minimum dose of X-rays for less influence of radiation.

Therefore, a scintillator panel has been demanded which is capable of imaging at a low dose while suppressing the contrast deterioration caused by scattered radiation, and further has improved radiation image characteristics.

SUMMARY

To achieve at least one of the abovementioned objects, an image forming apparatus reflecting one aspect of the present invention comprises a scintillator panel having a scintillator layer for converting radiation into light, characterized in that the scintillator layer is in direct contact on a photoelectric conversion element and comprises a reflecting layer and a scattered radiation diffusing layer on a radiation incident side thereof, the scattered radiation diffusing layer is present closer to the radiation incident side than the reflecting layer, and the scattered radiation diffusing layer has an X-ray transmittance of 99.5% or more.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention.

FIG. 1 is a schematic cross-sectional view of the scintillator panel according to the present invention.

DETAILED DESCRIPTION OF EMBODIMENTS

Hereinafter, one or more embodiments of the present invention will be described with reference to the drawings. However, the scope of the invention is not limited to the disclosed embodiments.

The scintillator panel of the present invention is a scintillator panel having a scintillator layer for converting radiation into light, wherein the scintillator layer is formed directly on a photoelectric conversion element and comprises a reflecting layer and a scattered radiation diffusing layer on a radiation incident side thereof, the scattered radiation diffusing layer is present closer to the radiation incident side than the reflecting layer, and the scattered radiation diffusing layer has an X-ray transmittance of 99.5% or more.

FIG. 1 shows a basic structure of such a radiation detector according to the present invention.

As shown in FIG. 1, in the scintillator panel according to the present invention, the scintillator layer is directly formed on a photoelectric conversion element and comprises a reflecting layer and scattered radiation diffusing layer on the radiation incident side of the scintillator.

Each constituent member will be explained below one by one.

Scintillator Layer

The scintillator layer is formed by a phosphor and plays a role in converting energy of incident X-rays from outside into visible light.

In the present invention, the phosphor is a phosphor which emits light by the excitation of atoms when ionizing radiation such as α-rays, γ-rays and X-rays is irradiated. In other words, it refers to a phosphor that converts radiation into ultraviolet and visible light and emits the ultraviolet and visible light. A phosphor is not particularly limited as long as it is a material that can efficiently convert radiation energy such as incident X-rays from outside into light. The conversion of the radiation into light does not necessarily have to be performed instantaneously. The radiation may be first stored in a phosphor layer as a latent image and read out later.

As the scintillator according to the present invention, substances capable of converting radiation such as X-rays into radiation having different wavelengths such as visible light can be appropriately used. Specifically, scintillators and phosphors described in "Phosphor Handbook" (edited by the Society of Phosphor Synthesis, Ohmsha Ltd., 1987) ranging from page 284 to page 299, substances listed in the web site "Scintillation Properties (http://scintillator.lbl.gov/)" of the US Lawrence Berkeley National Laboratory, or the like may be used, and substances not mentioned therein can also be used as scintillators as long as they are "substances capable of converting radiation such as X-rays into radiation having different wavelengths such as visible light".

Specific examples of the composition of the scintillator include the following examples. First, metal halide phosphors represented by $$M_I X \cdot a M_{II} X'_2 \cdot b M_{III} X''_3 : zA \qquad \text{the basic composition formula (I):}$$

can be included.

In the basic composition formula (I), $M_I$ represents at least one element selected from the group consisting of elements capable of becoming monovalent cations, that is, Li, Na, K, Rb, Cs, Tl, Ag, and the like.

$M_{II}$ represents at least one element selected from the group consisting of elements capable of becoming divalent cations, that is, Be, Mg, Ca, Sr, Ba, Ni, Cu, Zn, Cd, and the like.

$M_{III}$ represents at least one element selected from the group consisting of Sc, Y, Al, Ga, In, and elements belonging to lanthanoid.

X, X', and X" each represent a halogen element, and may be different or the same.

A represents at least one element selected from the group consisting of Y, Ce, Pr, Nd, Sm, Eu, Gd, Tb, Dy, Ho, Er, Tm, Yb, Lu, Na, Mg, Cu, Ag, Tl and Bi. a, b, and z each independently represent a numerical value within the range of $0 \leq a < 0.5$, $0 \leq b < 0.5$, $0 < z < 1.0$.

Rare earth activated metal fluorohalide phosphors represented by the basic composition formula (II): $M_{II}FX:zLn$ can also be included.

In the basic composition formula (II), $M_{II}$ represents at least one alkaline earth metal element, Ln represents at least one element belonging to the lanthanoid, and X represents at least one halogen element. z satisfies $0 < z \leq 0.2$.

Rare earth oxysulfide phosphors represented by $$Ln_2O_2S:zA \qquad \text{the basic composition formula (III):}$$

can be also included.

In the above basic composition formula (III), Ln represents at least one element belonging to the lanthanoid, and A represents at least one element selected from the group consisting of Y, Ce, Pr, Nd, Sm, Eu, Gd, Tb, Dy, Ho, Er, Tm, Yb, Lu, Na, Mg, Cu, Ag, Tl and Bi. z satisfies $0 < z < 1$.

In particular, $Gd_2O_2S$ using Gd as Ln is preferable since it is known to exhibit high emission characteristics in a wavelength region where the sensor panel is most likely to receive light by using Tb, Dy or the like as the element type of A.

Metal sulfide-based phosphors represented by $$M_{II}S:zA \qquad \text{the basic composition formula (IV):}$$

can be also included.

In the basic composition formula (IV), $M_{II}$ represents at least one element selected from the group consisting of elements capable of becoming divalent cations, that is, alkaline earth metals, Zn (zinc), Sr (strontium), Ga (gallium), and the like, and A represents at least one element selected from the group consisting of Y, Ce, Pr, Nd, Sm, Eu, Gd, Tb, Dy, Ho, Er, Tm, Yb, Lu, Na, Mg, Cu, Ag, Tl, and Bi. z satisfies $0 < z < 1$.

Metal oxoacid salt-based phosphors represented by $$M_{IIa}(AG)_b:zA \qquad \text{the basic composition formula (V):}$$

can be also included.

In the basic composition formula (V), $M_{II}$ represents a metal element which can be a cation, (AG) represents at least one oxo acid group selected from the group consisting of phosphate, borate, silicate, sulfate, tungstate and aluminate, and A represents at least one element selected from the group consisting of Y, Ce, Pr, Nd, Sm, Eu, Gd, Tb, Dy, Ho, Er, Tm, Yb, Lu, Na, Mg, Cu, Ag, Tl, and Bi.

a and b represent all possible values depending on the valence of the metal and oxo acid groups. z satisfies $0 < z < 1$.

Metal oxide-based phosphors represented by $$M_aO_b:zA \qquad \text{the basic composition formula (VI):}$$

can be also included.

In the basic composition formula (VI), M represents at least one element selected from metal elements which can become cations.

A represents at least one element selected from the group consisting of Y, Ce, Pr, Nd, Sm, Eu, Gd, Tb, Dy, Ho, Er, Tm, Yb, Lu, Na, Mg, Cu, Ag, Tl and Bi.

a and b represent all possible values depending on the valence of the metal and oxo acid groups. z satisfies $0 < z < 1$.

Furthermore, Metal acid halide-based phosphors represented by $$LnOX:zA \qquad \text{the basic composition formula (VII):}$$

can be also included.

In the above basic composition formula (VII), Ln represents at least one element belonging to the lanthanoid, X represents at least one halogen element, and A represents at least one element selected from the group consisting of Y, Ce, Pr, Nd, Sm, Eu, Gd, Tb, Dy, Ho, Er, Tm, Yb, Lu, Na, Mg, Cu, Ag, Tl and Bi. z satisfies $0 < z < 1$.

Materials forming a scintillator are not particularly limited as long as they can efficiently convert energy of incident X-rays from outside into light. Therefore, as long as the above condition is satisfied, a variety of phosphors conventionally known can be used as a scintillator. Among them, cesium iodide (CsI), gadolinium oxysulfide (GOS), cadmium tungstate (CWO), gadolinium silicate (GSO), bismuth germanate (BGO), lutetium silicate (LGO), lead tungstate (PWO) or the like can be used suitably. The scintillator used in the present invention is not limited to an instantaneously light-emitting phosphor such as CsI, and may be a photo-stimulable phosphor such as cesium bromide (CsBr) depending on the purpose.

In the present invention, among these materials, CsI is preferably because it can form a scintillator that shows a high efficiency of converting energy of radiation such as X-rays into visible light. In the present invention, it is preferable to include an activator in addition to CsI as a phosphor matrix. The activator concentration is expressed in mol %.

Preferable examples of the activator include those which contain at least one element selected from Tl, Eu, In, Li, K, Rb, Na or the like. These activators are present in the scintillator as an element. For the activator, for example, thallium iodide (TlI), thallium bromide (TlBr), thallium chloride (TlCl), thallium fluoride (TlF, $TlF_3$) or the like is used.

The activator contained in the scintillator preferably contains at least thallium. When thallium is contained, the wavelength of the fluorescence upon the irradiation of X-rays is not shifted, and the detection of fluorescence by the photoelectric conversion element is highly precise. The decrease in light reflectance after the irradiation of the radiation is further alleviated. Thus, a scintillator which satisfies the predetermined light reflectance as defined in the present invention can be provided.

In the present invention, the scintillator layer may be formed by one layer or two or more layers. The scintillator layer may consist of a scintillator layer, or may have a structure composed of a base layer and a scintillator layer in which the base layer and the scintillator layer are laminated in this order on a support. When the scintillator layer includes two layers of a base layer and a scintillator layer, these layers can be composed of the same or different materials as long as the same phosphor matrix compound is included. In other words, the scintillator layer may be one layer consisting of a phosphor matrix, or one layer entirely including a phosphor matrix compound and an activator. The scintillator layer may also be composed of a base layer consisting of a phosphor matrix compound as well as a scintillator layer including a phosphor matrix compound and an activator, or composed of a base layer including a phosphor matrix compound and a first activator as well as a scintillator layer including a phosphor matrix compound and a second activator.

In the scintillator layer according to the present invention, it is desirable that the relative activator content is an optimal amount depending on the purpose, performance and the like. With respect to the scintillator content, the relative activator content is preferably 0.001 mol % to 50 mol %, and further preferably 0.1 to 10.0 mol %. When the activator concentration is 0.001 mol % or more with respect to the scintillator, the light emission luminance improves more than when a scintillator is used alone. Thus, the concentration of 0.001 mol % or more is preferable in obtaining a targeted light emission luminance. In addition, the concentration is preferably 50 mol % or less in order to maintain the nature and functions of the scintillator.

The relative activator content of the base layer is preferably from 0.01 to 1 mol %, and more preferably from 0.1 to 0.7 mol %. In particularly, the relative activator content of the base layer of 0.01 mol % or more is preferable in terms of the improvement in the light emission luminance and storage stability of the scintillator panel Furthermore, the relative activator content of the base layer is very preferably smaller than the relative activator content of the scintillator layer. The molar ratio of the relative activator content of the base layer to that of the scintillator layer ((relative activator content of base layer)/(relative content of scintillator layer)) is preferably 0.1 to 0.7.

The scintillator layer is formed to be in direct contact on the photoelectric conversion element.

For a method for forming a scintillator layer, a method of applying a liquid mixture of scintillator powder, a binder resin and the like to form a coated film, a method of processing the liquid and the coated film to form a film having a regular array structure, a method of using a variety of vapor deposition methods to form a crystal film, or a method of transferring a separately-produced scintillator layer can be employed.

Examples of vapor deposition methods include physical vapor-deposition (PVD) methods and chemical vapor-deposition (CVD) methods. PVD methods include heating vapor deposition, sputtering, ion plating, and the like. In CVD methods, raw material gas is reacted to form a thin film. In one CVD method, plasma CVD, gas is transformed into plasma with energy of electromagnetic waves to form a scintillator layer composed of columnar crystals. A scintillator layer can also be formed by applying a sheet-shaped crystal.

In the present invention, a preferable aspect is a scintillator layer composed of columnar crystals directly vapor-deposited on the photoelectric conversion element.

In another preferable aspect, the scintillator layer is a coating containing scintillator particles. Scintillator particles are particles composed of one or more of the above-mentioned components, for example, ground product of a columnar crystal. A scintillator layer preferably contains an adhesive resin as a binder for scintillator particles. The adhesive resin is preferably a material that is transparent to the emission wavelength of the scintillator so as not to inhibit the propagation of light emitted from the scintillator.

The adhesive resin is not particularly limited as long as the object of the present invention is not impaired, and examples thereof include natural polymers such as proteins such as gelatin, polysaccharides such as dextran, or gum arabic; and synthetic polymeric substances such as polyvinyl butyral, polyvinyl acetate, nitrocellulose, ethylcellulose, vinylidene chloride-vinyl chloride copolymer, poly(meth) acrylate, vinyl chloride-vinyl acetate copolymer, polyurethane, cellulose acetate butyrate, polyvinyl alcohol, polyester, epoxy resin, polyolefin resin, and polyamide resin. These resins may be crosslinked with a crosslinking agent such as epoxy or isocyanate, and these adhesive resins may be used singly or in combination of two or more kinds. The adhesive resin may be either a thermoplastic resin or a thermosetting resin.

The content of the adhesive resin in the scintillator layer is preferably from 1 to 70 vol %, more preferably from 5 to 50 vol %, and still more preferably from 10 to 30 vol %. When the content is lower than the lower limit of the above range, sufficient adhesiveness cannot be obtained, and conversely, when the content is higher than the upper limit of the above range, the content of the scintillator becomes insufficient and the amount of luminescence decreases.

For a method for forming a scintillator layer by coating, a composition in which the scintillator particles and an adhesive resin are dissolved or dispersed in a solvent may be coated, or a composition prepared by heating and melting a mixture containing the scintillator particles and an adhesive resin may be coated.

When coating the composition in which the scintillator particles and the adhesive resin are dissolved or dispersed in a solvent, examples of usable solvents include: lower alcohols such as methanol, ethanol, isopropanol, and n-butanol; ketones such as acetone, methyl ethyl ketone, methyl isobutyl ketone, and cyclohexanone; esters of lower fatty acids and lower alcohols such as methyl acetate, ethyl acetate, and n-butyl acetate; ethers such as dioxane, ethylene glycol monoethyl ether, and ethylene glycol monomethyl ether; aromatic compounds such as triol and xylol; halogenated hydrocarbons such as methylene chloride and ethylene chloride; and mixtures thereof. A variety of additives such as a dispersant for improving dispersibility of scintillator particles in the composition and a curing agent or a plasticizer for improving the bonding force between an adhesive resin and scintillator particles in a scintillator layer after the formation may be mixed in the composition.

Examples of the dispersant used for such a purpose include phthalic acid, stearic acid, caproic acid, and a lipophilic surfactant.

Examples of the plasticizer include: phosphoric acid esters such as triphenyl phosphate, tricresyl phosphate, and diphenyl phosphate; phthalic acid esters such as diethyl phthalate and dimethoxyethyl phthalate; glycolic acid esters such as ethyl phthalyl ethyl glycolate and butyl phthalyl butyl glycolate; and polyesters of polyethylene glycol and aliphatic dibasic acids such as polyesters of triethylene glycol and adipic acid, and polyesters of diethylene glycol and succinic acid. As the curing agent, a known curing agent for a thermosetting resin can be used.

When heating and melting the mixture containing the scintillator particles and the adhesive resin, it is preferable to use a hot-melt resin as the adhesive resin. As the hot-melt resin, for example, one mainly composed of a polyolefin-based, polyamide-based, polyester-based, polyurethane-based, or acrylic-based resin can be used. Among these, from viewpoints of light permeability, moisture resistance, and adhesiveness, those based on a polyolefin resin as a main component are preferable. As the polyolefin-based resin, for example, an ethylene-vinyl acetate copolymer (EVA), an ethylene-acrylic acid copolymer (EAA), an ethylene-acrylic acid ester copolymer (EMA), an ethylene-methacrylic acid copolymer (EMAA), an ethylene-methacrylic acid ester copolymer (EMMA), an ionomer resin or the like can be used. These resins may be used as a so-called polymer blend in which two or more kinds of resins are combined.

There are no particular restrictions on means for coating a composition for forming a scintillator layer, and usual coating means such as a doctor blade, a roll coater, a knife coater, an extrusion coater, a die coater, a gravure coater, a lip coater, a capillary coater, or a bar coater can be used.

The thickness of the scintillator layer is preferably 100 to 800 μm, and more preferably 120 to 700 μm in terms of a good balance between luminance and sharpness characteristics. From viewpoints of the maintenance of high luminance and sharpness, the layer thickness of the base layer is preferably 0.1 μm to 50 μm, and more preferably 5 μm to 40 μm.

Reflecting Layer

In the present invention, a reflecting layer is provided on the radiation incident side of the scintillator layer. The reflecting layer reflects light emitted from the scintillator layer. With the emitted light reflected, the light emitted in the scintillator is efficiently led to a sensor and the sensitivity improves.

The reflecting layer is preferably composed of a material with a high light reflectance, and is usually formed by a metal reflecting layer. For a metal material that can form such a metal reflecting layer, the metal reflecting layer preferably contains a metal material such as aluminum, silver, platinum, palladium, gold, copper, iron, nickel, chromium, cobalt, magnesium, titanium, rhodium, stainless or the like. Among these, from viewpoints of the reflectance, it is particularly preferable that the metal reflecting layer is contains silver or aluminum as a main component. In a typical aspect of the present invention, a metal material forming a metal reflecting layer is an elemental metal or in a form of an alloy of elemental metals.

However, as long as the light scattering does not become stronger, the metal material is not necessarily limited to an elemental metal or an alloy form of elemental metals, and it may be in a form of a corresponding metallic oxide. In this case, a so-called dielectric multilayer having a reflection function in which several thin films prepared with a metallic oxide are laminated can be considered. Suitable examples of a metallic oxide used in such a dielectric multilayer include aluminum oxide ($Al_2O_3$), titanium oxide ($TiO_2$), silicone oxide ($SiO_2$), niobium oxide ($Nb_2O_5$), and tantalum oxide ($Ta_2O_5$).

Examples of methods for providing a metal reflecting layer on a support surface include a method of using a known process such as vapor deposition or sputtering. It is also possible to form a thin film of metal such as aluminum and apply the film later. A metal foil can also be pressure bonded via an adhesive, but the intervening adhesive can cause light absorption and the amount of light can decrease. In this regard, sputtering is preferable. When a light detector is present on the support side, the metal reflecting layer can be provided on the side opposite to the support with the scintillator layer in-between. In this case, it is particularly preferable to apply a thinned metal film because a film on which a crack easily occurs due to the concavity and convexity of the scintillator layer, such as a film formed by vapor deposition or sputtering, can be avoided.

Furthermore, the reflecting layer may be a reflecting layer composed of a binder resin and at least either of light scattering particles or a gap. One aspect thereof can include a coated reflecting layer.

Examples of the binder resin include polymers having easy adhesion such as polyurethane, vinyl chloride copolymers, vinyl chloride-vinyl acetate copolymers, vinyl chloride-vinylidene chloride copolymers, vinyl chloride-acrylonitrile copolymers, butadiene-acrylonitrile copolymers, polyamide resins, polyvinyl butyral, polyesters, cellulose derivatives (nitrocellulose and the like), styrene-butadiene copolymers, various synthetic rubber-based resins, phenolic resins, epoxy resins, urea resins, melamine resins, phenoxy resins, silicone resins, acrylic resins, and urea formamide resins.

Among these, polyurethane, a polyester, a silicone resin, an acrylic resin or polyvinyl butyral is preferably used. Two or more kinds of these binders can be mixed and used.

A light scattering particle is preferably composed of a white pigment in terms of the light refraction.

Examples of the white pigment include $TiO_2$ (anatase form, rutile form), MgO, $PbCO_3 \cdot Pb(OH)_2$, $BaSO_4$, $Al_2O_3$, M(II)FX (provided that M(II) represents at least one atom selected from atoms of Ba, Sr and Ca, and X represents a Cl atom or a Br atom), $CaCO_3$, ZnO, $Sb_2O_3$, $SiO_2$, $ZrO_2$, lithopone (BaSO$_4$.ZnS), magnesium silicate, basic silicate salt, basic lead phosphate, and aluminum silicate. These white pigments may be used alone or used in combination.

Among these white pigments, TiO$_2$, Al$_2$O$_3$ or the like has a strong covering ability and a large refractive index. Therefore, by reflecting and refracting diffused light, the diffused light can be returned to the scintillator layer before scattered light spreads in a horizontal direction. As a result, in addition to the increased resulting luminance, it is also possible to return effectively diffused light which has been responsible for image blurring to the scintillator layer, and thus the image quality can be improved remarkably.

For the crystal structure of titanium oxide, either the rutile form or the anatase form can be used, but the rutile form is preferable because the difference in refractive indexes between the rutile form and a resin is large and thus high luminance can be achieved.

Specific examples of titanium oxide include CR-50, CR-50-2, CR-57, CR-80, CR-90, CR-93, CR-95, CR-97, CR-60-2, CR-63, CR-67, CR-58, CR-58-2, and CR-85 which are produced with hydrochloric acid, and R-820, R-830, R-930, R-550, R-630, R-680, R-670, R-580, R-780, R-780-2, R-850, R-855, A-100, A-220 and W-10 which are produced with sulfuric acid (above brand names: manufactured by ISHIHARA SANGYO KAISHA, LTD.).

The primary particle size of light scattering particles is preferably within the range of 0.1 to 0.5 µm, and more preferably within the range of 0.2 to 0.3 µm. Light scattering particles are preferably surface treated with an oxide of, for example, Al, Si, Zr or Zn for improving affinity with polymers and dispersibility and suppressing the deterioration of polymers.

The reflecting layer may contain a gap instead of the above light scattering particles. Since light refracts likewise in a gap as well, the gap can allow more diffused reflection light to return to the scintillator layer similarly to light scattering particles.

Examples of methods for forming a gap inside include various methods such as a method of using a foam-forming agent, a method of injecting gas and lowering the pressure, and a method by stretching. The formation of a gap by a foam-forming agent produces an interior gap in a sphere shape or an oval sphere shape, thereby allowing for the even formation of numerous fine gaps. Therefore, a method of forming a gap with a foam-forming agent is desirable.

The thickness of the reflecting layer is not particularly limited, and is appropriately selected depending on the structure of the reflecting layer to be formed. In the case of a metal reflecting layer, for example, it is suitable that the thickness is preferably 0.005 to 0.3 µm, and more preferably 0.01 to 0.2 µm from viewpoints of light-extraction efficiency. In the case of a coated reflecting layer, the thickness is preferably 10 to 500 µm in terms of the luminance and the flatness of the reflecting layer surface. However, the thickness is not limited to these.

The distance between the reflecting layer and the scintillator layer is preferably 75 µm or less, more preferably 45 µm or less, and particularly preferably 30 µm or less in terms of the sharpness, luminance, light-extraction efficiency and the like. The distance of 0 µm means that there is no distance between the reflecting layer and the scintillator layer and that nothing is present between the layers. In the present invention, another layer may be present or absent between the reflecting layer and the scintillator layer.

For example, an organic material layer may be formed. The organic material layer preferably contains a polymer binding agent (binder), a dispersant or the like. The refractive index of the organic material layer is within the range of 1.4 to 1.6, although it varies depending on the type of the material. Specific examples of the polymer binding agent to be used in the organic material layer include polymers having easy adhesion such as polyurethane, vinyl chloride copolymers, vinyl chloride-vinyl acetate copolymers, vinyl chloride-vinylidene chloride copolymers, vinyl chloride-acrylonitrile copolymers, butadiene-acrylonitrile copolymers, polyamide resins, polyvinyl butyral, polyesters, cellulose derivatives (nitrocellulose and the like), styrene-butadiene copolymers, various synthetic rubber-based resins, phenolic resins, epoxy resins, urea resins, melamine resins, phenoxy resins, silicone resins, acrylic-based resins, and urea formamide resins.

Scattered Radiation Diffusing Layer

In the present invention, a scattered radiation diffusing layer is present closer to the radiation incident side than the reflecting layer, and the X-ray transmittance of scattered radiation diffusing layer is 99.5% or more.

Scattered radiation occurs when radiation scatters upon the irradiation of the radiation onto a subject. When a plate member or a case is arranged as a protection member, the radiation scatters on the plate member as well, causing scattered radiation.

In the present invention, such scattered radiation is diffused by providing a scattered radiation diffusing layer. The scattered radiation diffusing layer is composed of a material which lets radiation pass through but diffuses scattered radiation. Examples of such a material include following materials.

Polyethylene-based, polyvinyl-based, polyamide-based, polyester-based, and polyparaxylylene-based resins can be included. Specific and available examples thereof include polyvinyl resins such as polyethylene resins (including other copolymers with α-olefins), polystyrene resins, vinyl chloride resins, vinyl acetate resins, ethylene-vinyl acetate copolymer resins, vinyl chloride-vinyl acetate copolymer resins, polyacrylic resins, and polymethacrylic resins, aliphatic or aromatic polyamide resins, polyester resins such as PET and PEN, polyparaxylylene resins such as polydimethylparaxylylene and polydiethylparaxylylene.

In addition, a thermoplastic resin such as a cellulosic resin, a polyether resin, a polyolefin resin, a urethane resin, a silicone resin and an imide resin, and a thermosetting resin such as a phenolic resin, a urea resin, a diallyl phthalate resin, a melamine resin, a guanamine resin, an unsaturated polyester resin, a polyurethane resin, an epoxy resin, an amino alkyd resin, a melamine-urea co-condensed resin, a silicon resin, and a polysiloxane resin can be also used.

The scattered radiation diffusing layer may be also one in which scattering particles are dispersed in the above binder resin.

Scattered radiation diffusing particles are not particularly limited as long as they can diffuse light, and can be appropriately selected depending on the purpose. They may be organic or inorganic particles, and may contain two or more kinds of particles.

Examples of organic particles include polymethyl methacrylate particles, cross-linked polymethyl methacrylate particles, acryl-styrene copolymer particles, melamine particles, polycarbonate particles, polystyrene particles, cross-linked polystyrene particles, polyvinyl chloride particles, and benzoguanamine-melamine-formaldehyde particles.

Examples of inorganic particles include ZrO$_2$, TiO$_2$, Al$_2$O$_3$, In$_2$O$_3$, ZnO, SnO$_2$, and Sb$_2$O$_3$. Among these, TiO$_2$, ZrO$_2$, ZnO and SnO$_2$ are particularly preferable.

The thickness of the scattered radiation diffusing layer is preferably 10 µm or more, more preferably within the range of 15 to 500 µm. The thickness in this range exhibits a high diffusion effect of the scattered radiation. When the thickness is small, the degree of scattering may lower.

Since inorganic materials absorb a large amount of X-rays and thus the utilization efficiency of X-rays decreases, it is preferable that the scattered radiation diffusing layer contains an organic material as a main component.

A method for forming a scattered radiation diffusing layer is not particularly limited, and a resin component may be coated or vapor-deposited, or a pre-made diffusing layer may be transferred.

For the scintillator panel according to the present invention, after a scintillator layer is formed directly on a photoelectric conversion element, a reflecting layer and a scattered radiation diffusing layer are provided. An organic material layer may be also provided between the scintillator layer and the reflecting layer.

Thus, the present invention is configured such that scattered radiation does not reach the scintillator layer, and the influence of the scattered radiation can be decreased. This is more effective when a scattered radiation diffusing layer having a predetermined X-ray transmittance is arranged in a predetermined position.

By providing scattered radiation diffusing layer in a predetermined position, scattered radiation is diffused. Consequently, a scintillator panel can be obtained which is capable of imaging at a low dose while suppressing the contrast deterioration caused by scattered radiation, and further has improved radiation image characteristics.

By providing such a scattered radiation diffusing layer, the present inventors consider the following function effects.
(1) Regarding the photoelectric effect, since the effect is proportional to the number of protons in the structural elements of the above layer, the absorption amount in the X-ray absorbing layer (large photoelectric effect) such as in Patent Document 1 can be suppressed, and the intensity of X-rays which is responsible for the image formation is unlikely to decrease. Especially, when the scattered radiation diffusing layer is formed of a resin, the structural element (carbon) has a smaller number of protons than air (nitrogen, oxygen), the intensity of X-rays which is responsible for the image formation is unlikely to decrease even in comparison with the air gap method.
(2) Since the degrees of Compton scattering and Thomson scattering are proportional to the number of protons and the density of the structural element in addition to the photon energy of X-rays, the scattering degree increases more when some solid (high density) is sandwiched than when air (low density) is sandwiched.

By further providing a predetermined reflecting layer on the scintillator side, light emitted in the scintillator can be reflected before it is diffused, and the effect of improving the luminance and MTF is also achieved.

Photoelectric Conversion Element

The photoelectric conversion element serves to absorb and convert light emitted from the scintillator layer into an electrically charged form, thus into an electric signal, and output the electric signal to the outside of the radiation image detector. A conventionally known photoelectric conversion element can be used.

Although the structure of the photoelectric conversion element used in the present invention is not particularly limited, the photoelectric conversion element usually has a structure in which a substrate, an image signal output layer, and a photoelectric conversion element are laminated together in this order.

The photoelectric conversion element has a function to absorb and convert light generated in the scintillator layer into an electrically charged form. The photoelectric conversion element may have any specific structure as long as the element has such a function. For example, the photoelectric conversion element used in the present invention can be composed of a transparent electrode, an electric charge generation layer that generates electric charge by the excitation due to input light, and a counter electrode. For the transparent electrode, the electric charge generation layer, and the counter electrode, those which are conventionally known can be used. The photoelectric conversion element used in the present invention may be composed of a suitable photo sensor. For example, it may be composed of several photodiodes which are arranged two-dimensionally, or composed of a two-dimensional photo sensor such as a charge coupled device (CCD) or a complementary metal-oxide-semiconductor (CMOS).

The image signal output layer serves to accumulate electric charge obtained by the above photoelectric conversion element and output a signal based on the accumulated electric charge. The image signal output layer may have any specific structure. For example, the image signal output layer can be formed using a capacitor as an electric charge accumulation element that accumulates electric charge generated by the photoelectric conversion element in each pixel and a transistor as an image signal output element that outputs the accumulated electric charge as a signal. Preferable examples of the transistor include thin film transistors (TFT).

The substrate serves as a support of the radiation detector and can be the same as the support used in the radiation detector of the present invention as described above.

The photoelectric conversion element can further include various components which can be contained in a photoelectric conversion element panel forming a known radiation detector, such as a memory unit for storing an image signal based on intensity information and position information of X-rays converted into an electric signal, a power supply unit for supplying power necessary to drive the photoelectric conversion element panel, and a communication output unit for extracting image information to the outside.

The scintillator panel as described above can be applied to various aspects of an X-ray image forming system.

The radiation detector according to the present invention comprises the scintillator panel and photoelectric conversion element as described above, which photoelectric conversion element detects light converted by the scintillator panel.

EXAMPLES

The present invention will be described by way of Examples, but is not limited thereto.

In Examples and Comparative Examples, the dose at the time of imaging and contrast were evaluated as follows.
(Dose at the Time of Imaging)
X-rays were irradiated, and when the amount of X-rays which reached the scintillator was the same as that in Comparative Example 1, it was evaluated as "○", when the amount was smaller than that of Comparative Example 1, it was evaluated as "Δ."
(Contrast)
Contrast was evaluated by a lead disc method in which the diameter of the lead disc placed on the scattered radiation was varied. Contrast was calculated when the diameter φ of the lead disc placed on the radiation incident side of the radiation image detecting apparatus was varied. When the contrast was within a range acceptable in the practical use of the radiation image detecting apparatus, it was evaluated as "○", and when the contrast was outside the range, it was evaluated as "Δ."

(Luminance)

X-rays with a tube voltage of 80 kVp were irradiated onto the above radiation image detecting apparatus, and an average signal value of obtained image data was used as an amount of light emission to evaluate the luminance of the resulting radiation image, i.e., X-ray image. The luminance of the X-ray image calculated based on the amount of light emission of the radiation image detecting apparatus of Comparative Example 1 was considered as 1.0. When the luminance of the resulting X-ray image was one time (same) or more and less than 1.1 times higher, the radiation image detecting apparatus was evaluated as "○", and when the luminance was 1.1 times or more higher, the radiation image detecting apparatus was evaluated as "◎."

(MTF)

X-rays having a tube voltage of 80 kVp were irradiated onto a radiation incidence surface side of the radiation image detecting apparatus through an MTF chart made of lead and image data was detected and recorded in a hard disk. After that, the record in the hard disk was analyzed by a computer, and a modulation transfer function (MTF) of the X-ray image recorded in the hard disk was used as an index of sharpness of the resulting X-ray image. In Table, a higher MTF value means that the above sharpness is better. The modulation transfer function (MTF) represents an MTF value at a spatial frequency of 1 cycle/mm. MTF stands for Modulation Transfer Function. The average MTF of the radiation image detecting apparatus of Comparative Example 1 was considered as 1.0. When the average MTF value was one time (same) or more and less than 1.1 times greater, the radiation image detecting apparatus was evaluated as "○", and when the average MTF value was 1.1 times or more greater, the radiation image detecting apparatus was evaluated as "◎".

(Overall Evaluation)

In Table, the overall evaluation of Comparative Example which contained one or more "Δ" was evaluated as "Δ". The overall evaluation of Example which did not contain "Δ" was evaluated as "○". Among Examples, the overall evaluation of Example which contained one or more "◎" was evaluated as "◎".

Comparative Example 1

(The Production of a Radiation Image Detecting Apparatus)

A scintillator layer was formed by vapor-depositing a phosphor material (CsI(Tl)(0.3 mol %)) on a photoelectric conversion element panel by use of a vapor deposition apparatus.

Specifically, the above phosphor material (CsI(Tl)(0.3 mol %)) was filled as a vapor deposition material in a resistance heating crucible, a support was placed on a substrate holder, and the distance between the support and the vapor-deposition source was adjusted to 400 mm.

Then, the vapor-deposition apparatus was evacuated, and Argon (Ar) gas was introduced to adjust the degree of vacuum to 0.5 Pa. The vapor deposition substrate was then rotated at a speed of 10 rpm while keeping the temperature of the substrate for vapor-deposition at 180° C. The resistance heating crucible was heated to vapor-deposit the phosphor, and the vapor deposition was terminated when the thin film of the phosphor layer was 400 μm to obtain a radiation image detecting apparatus.

(The Production of a Hot-Melt Sheet)

An ethylene-vinyl acetate copolymer (melting point 70° C.) was melted at 200° C., and then an extrusion coater was used to produce a hot-melt sheet with a thickness of 60 μm. A hot-melt sheet corresponds to an organic material layer.

(The Production of a Reflecting Layer)

An Al foil with a thickness of 20 μm was applied on the above radiation image detecting apparatus via the above hot-melt sheet. The application was done by heating at 75° C. for 15 minutes with the pressure of 100 kPa applied.

Comparative Example 2

Comparative Example 2 had the same structure as in Comparative Example 1 except that a Cu film of 500 μm was applied on the reflecting layer of Comparative Example 1 as a scattered radiation absorbing layer.

Example 1

Example 1 had the same structure as in Comparative Example 1 except that a PET film (X-ray transmittance 99.9%) of 15 μm was applied on the reflecting layer of Comparative Example 1 as a scattered radiation diffusing layer.

Example 2

Example 2 had the same structure as in Example 1 except that the thickness of the hot-melt sheet of Comparative Example 1 was 30 μm.

TABLE 1

| | Scattered radiation diffusing layer | | | Distance between scintillator and reflecting layer (μM) | Dose at the time of imaging | Contrast | Luminance | MTF | Overall evaluation |
|---|---|---|---|---|---|---|---|---|---|
| | Material | Thickness μm | | | | | | | |
| Comparative Example 1 | | Not formed | | 60 μm | ○ | Δ | ○ | ○ | Δ |
| Comparative Example 2 | Cu | 500 | Absorbing layer | 60 μm | Δ | ○ | ○ | ○ | Δ |
| Example 1 | PET | 15 | | 60 μm | ○ | ○ | ○ | ○ | ○ |
| Example 2 | PET | 15 | | 30 μm | ○ | ○ | ◎ | ◎ | ◎ |

Although embodiment of the present invention have been described and illustrated in detail, it is clearly understood that the same is by way of illustration and example only and not limitation, the scope of the present invention should be interpreted by terms of the appended claims.

What is claimed is:

1. A scintillator panel having a scintillator layer for converting radiation into light, wherein the scintillator layer is in direct contact on a photoelectric conversion element and comprises a reflecting layer and a scattered radiation diffusing layer on a radiation incident side thereof, the scattered radiation diffusing layer is present closer to the radiation incident side than the reflecting layer, and the scattered radiation diffusing layer has an X-ray transmittance of 99.5% or more.

2. The scintillator panel according to claim 1, wherein the scintillator layer is a vapor deposition product of a phosphor or a coating containing scintillator particles.

3. A radiation detector comprising the scintillator panel according to claim 2 and a photoelectric conversion element for detecting light converted by the scintillator panel.

4. The scintillator panel according to claim 1, wherein the distance between the scintillator and the reflecting layer is 75 μm or less.

5. A radiation detector comprising the scintillator panel according to claim 4 and a photoelectric conversion element for detecting light converted by the scintillator panel.

6. The scintillator panel according to claim 1, wherein the scattered radiation diffusing layer has a thickness of 10 μm or more.

7. A radiation detector comprising the scintillator panel according to claim 6 and a photoelectric conversion element for detecting light converted by the scintillator panel.

8. The scintillator panel according to claim 1, wherein the scattered radiation diffusing layer is composed of an organic material as a main component.

9. A radiation detector comprising the scintillator panel according to claim 8 and a photoelectric conversion element for detecting light converted by the scintillator panel.

10. A radiation detector comprising the scintillator panel according to claim 1 and a photoelectric conversion element for detecting light converted by the scintillator panel.

* * * * *